United States Patent
Ramasamy et al.

(10) Patent No.: US 8,559,630 B2
(45) Date of Patent: *Oct. 15, 2013

(54) SYSTEMS AND METHODS FOR ENCRYPTING DATA

(75) Inventors: Arul Selvan Ramasamy, Bangalore (IN); Gosukonda Naga Venkata Satya Sudhaker, Bangalore (IN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,671

(22) Filed: Apr. 27, 2012

(65) Prior Publication Data

US 2012/0207301 A1    Aug. 16, 2012

Related U.S. Application Data

(63) Continuation of application No. 11/981,197, filed on Oct. 31, 2007, now Pat. No. 8,189,769.

(30) Foreign Application Priority Data

Jul. 31, 2007    (IN) .......................... 1617/DEL/2007

(51) Int. Cl.
*H04L 29/06*    (2006.01)
(52) U.S. Cl.
USPC .............................. 380/28; 380/37; 713/193
(58) Field of Classification Search
None
See application file for complete search history.

(56) References Cited

U.S. PATENT DOCUMENTS

| | | | |
|---|---|---|---|
| 6,061,449 A * | 5/2000 | Candelore et al. | 380/28 |
| 6,233,589 B1 | 5/2001 | Balcha et al. | |
| 7,240,202 B1 | 7/2007 | Orman | |
| 7,908,490 B2 | 3/2011 | Sudhakar | |
| 2005/0094805 A1 | 5/2005 | Kitani et al. | |
| 2009/0006869 A1 | 1/2009 | Satya Sudhakar | |
| 2009/0034715 A1 | 2/2009 | Ramasamy et al. | |
| 2009/0138948 A1* | 5/2009 | Calamera et al. | 726/6 |

OTHER PUBLICATIONS

Fruhwirth, Clemens, et al., "Secret Messages (Hard Disk Encryption with DM-Crypt, LUKS, and cryptsetup)", www.linux-magazine.com, Issue 61, (Dec. 2005), pp. 65-71.

* cited by examiner

*Primary Examiner* — Hadi Armouche
(74) *Attorney, Agent, or Firm* — Blakely, Sokoloff, Taylor & Zafman LLP

(57) ABSTRACT

Data encryption techniques are presented. According to an embodiment of a method, a cryptographic hash of unencrypted data for data block X−1 is generated, and a hash of an encryption key is generated. An initialization vector for data block X is generated using the cryptographic hash and the hash of the encryption key. Data block X−1 and data block X are logically contiguous and data block X−1 logically precedes data block X. Encryption data for data block X is generated from unencrypted data for data block X using the initialization vector.

20 Claims, 4 Drawing Sheets

| $E_Y$ | $E_{Y+1}$ | $E_{Y+2}$ | ... | $E_{Z-2}$ | $E_{Z-1}$ | $E_Z$ |
|---|---|---|---|---|---|---|
| NC | C | C | C | C | C | NC |

| $P_Y$ | $P_{Y+1}$ | $P_{Y+2}$ | ... | $P_{Z-2}$ | $P_{Z-1}$ | $P_Z$ |
|---|---|---|---|---|---|---|
| NC | C | ? | ? | C | NC | NC |

FIG. 5A

| $P_{Y-1}$ | $P_Y$ | $P_{Y+1}$ | ... | $P_{Z-2}$ | $P_{Z-1}$ | $P_Z$ | $P_{Z+1}$ |
|---|---|---|---|---|---|---|---|
| NC | NC | C | C | C | C | NC | NC |

|  | $E_Y$ | $E_{Y-1}$ | ... | $E_{Z-2}$ | $E_{Z-1}$ | $E_Z$ | $E_{Z+1}$ |
|---|---|---|---|---|---|---|---|
|  | NC | C | C | C | C | C | NC |

FIG. 5B

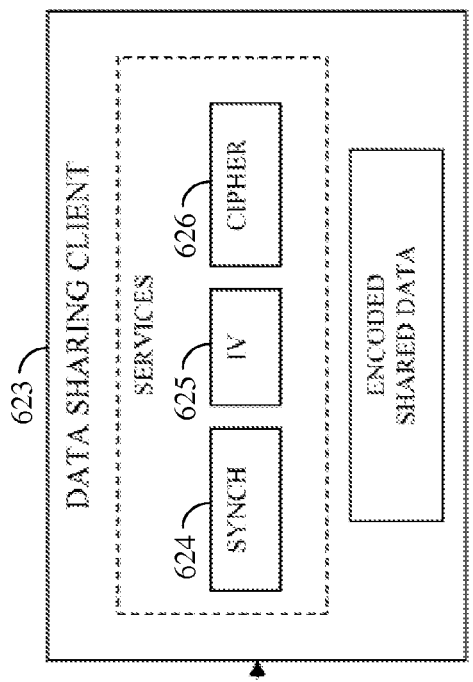
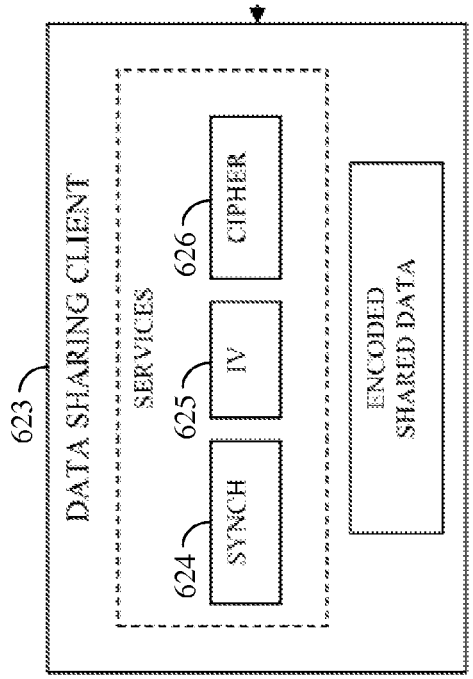
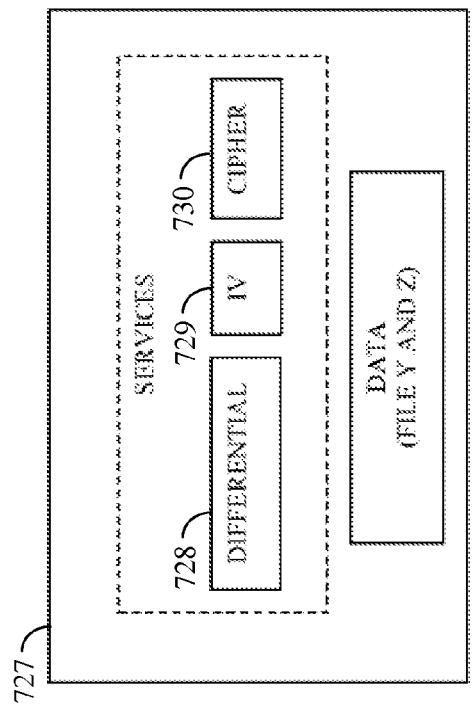
FIG. 6
FIG. 7

SYSTEMS AND METHODS FOR ENCRYPTING DATA

RELATED APPLICATIONS

This application is a continuation of U.S. patent application Ser. No. 11/981,197, filed on Oct. 31, 2007 and entitled "SYSTEMS AND METHODS FOR ENCRYPTING DATA," now U.S. Pat. No. 8,189,769, which claims priority to India Patent Application No. 1617/DELI2007 filed in the India Patent Office on Jul. 31, 2007 and entitled "SYSTEMS AND METHODS FOR ENCRYPTING DATA;" the disclosures of which are both incorporated by reference herein in their entireties.

FIELD

The present subject matter relates generally to data storage processing and more particularly to systems and methods for encrypting and decrypting data.

BACKGROUND

Increasingly enterprises and individuals expect to have access to information twenty-four hours a day, seven days a week, and three-hundred sixty-five days a year. Additionally, since the world economy has become highly networked, the location of the information desired by users has become largely irrelevant.

Many techniques are deployed by enterprises to ensure that their data is available when requested or when failures occur. One such technique employs data replication or mirroring; such that the data is available from multiple independent data sources should some type of failure occur. Replication techniques may only detect and send the modified blocks, which reduces the amount of data that is sent between replication clients, and requires less bandwidth and time to provide the data replication.

The security of data is also a significant concern for enterprises. Thus, replicated data is often encrypted. A variety of techniques exists for encrypting data in blocks on a storage volume and securely delivering decrypted versions of the blocks as needed.

Each of the available techniques for securely encrypting and decrypting blocks of data has their own advantages and disadvantages. Choices among encryption techniques can involve tradeoffs between the degree of security and the data processing demands to implement the encryption. The data processing demands are reflected in the increased costs associated with increased processing and storage bandwidth, and/or slower processing speeds. Some encryption techniques encrypt blocks based on the data contained in other blocks, where the modification of one block changes the encryption in many other blocks (e.g. all of the blocks that are logically subsequent to the modified block). When a block is added or removed, then all the blocks from those that were inserted or deleted have to be resynchronized when remote resynchronization tools are used or when file difference generating algorithms are used, since all those blocks are changed. This is a costly operation in terms of memory and processing.

Therefore, improved techniques for synchronizing encrypted files are desirable.

SUMMARY

Various embodiments provide data encryption techniques. According to an embodiment of a method, a cryptographic hash of unencrypted data for block X-1 is generated, and a hash of an encryption key is generated. An initialization vector for block X is generated using the cryptographic hash and the hash of the encryption key. Block X-1 and block X are logically contiguous and block X-1 logically precedes block X. Encryption data for block X is generated from unencrypted data for block X using the initialization vector.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

BRIEF DESCRIPTION OF THE DRAWINGS

FIG. 5A illustrates the relationship between a successive series of changed encrypted blocks and their corresponding plaintext blocks; and FIG. 5B illustrates the relationship between a successive series of changed plaintext blocks and their corresponding encrypted blocks.

FIG. 6 illustrates an embodiment of a file synchronization system.

FIG. 7 illustrates an embodiment of a file differential system. The system is implemented in a machine-accessible and readable medium and is accessible over a network.

DETAILED DESCRIPTION

Figure 1:
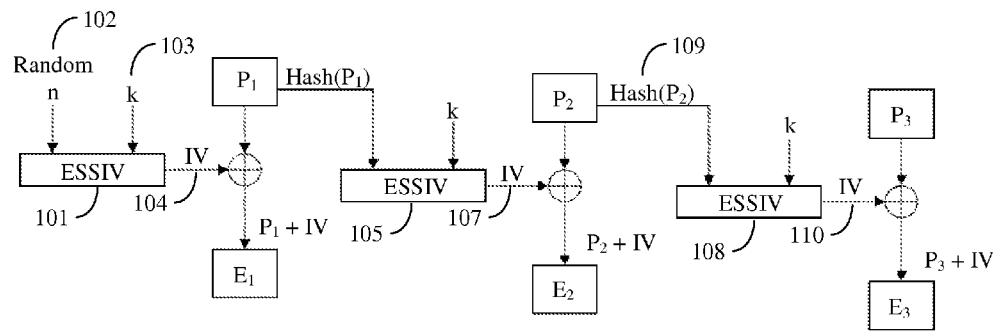
FIG. 1 illustrates an embodiment of a method for encrypting blocks of a file, according to various embodiments.

As used herein, a "file" refers to a logical grouping of information organized in a particular fashion and accessed and consumed by a resource (e.g., user or automated service, etc.) as a single document or unit of information. The underlying services that manage the file on a storage volume or machine may or may not store the data associated with the file in a contiguous fashion. But from the perspective of the resource, the file looks and behaves as if the data is contiguous.

In fact, at lower levels of implementation, a file is often broken into equal sized chunks called "blocks." The maximum number of blocks for any given file can be provided as a configuration to storage management services or can be calculated by dividing the system limit or policy-based limit for the size of any given file by a desired block size (maximum_file_size divided by block_size=max_number_of_blocks). As stated above, a file looks and behaves as if the data is contiguous from the perspective of a resource. The apparent contiguous nature of the data of the file to the resource is referred to herein as logically adjacent data (or logically adjacent data blocks). Given the apparent contiguous nature of the data, data blocks have a logical sequential order, such that one data block can be logically precedent or logically subsequent to another data block.

In cryptography, encryption involves processing plaintext ($P_x$) into encrypted text ($E_x$), and decryption involves processing encrypted text ($E_x$) into plaintext ($P_x$). An initialization vector (IV) is a block of bits that is required to allow a stream cipher or a block cipher to be executed in any of several modes of operation to produce a unique stream independent from other streams produced by the same encryption key, without having to go through a (usually lengthy) re-keying process. An "initialization vector" (IV) is a block of bits generated by an encryption key that when provided to a cipher service along with a block of data for a file produces an encrypted or decrypted version of that block of data. Yet, having the IV is not particular useful in discovering the encryption/decryption being used by the cipher service. The point of the IV and the cipher service is to prevent unauthorized access to blocks of a file or to versions of files. With other storage encryption techniques, should an intruder discover how a particular block is encoded, then the intruder could potentially discover how some other similar blocks are encoded and thus compromise the entire storage environment and its encrypted data and files. The IV and cipher service combination provides a random and yet repeatable mechanism for one block to be dependent and yet also independent from the other blocks of a file. So, the discovery of the encoding of one block but this will not assist in the discovery of the other blocks.

IVs are implemented differently in block ciphers and in stream ciphers. In straight-forward operation of block ciphers or so-called Electronic Code Book (ECB) mode, encryption of the same plain text with the same key results in the same ciphertext, which is a considerable threat to security. Use of an IV linearly added to (XORed with) the first block of plaintext or included in front of the plaintext prior to encryption in one of the streaming modes of operation resolves this problem. In stream ciphers, IVs are loaded into the keyed internal secret state of the cipher, after which a number of cipher rounds is executed prior to releasing the first bit of output.

In cryptography, a cryptographic hash function is a hash function with certain additional security properties to make it suitable for use as a primitive in various information security applications, such as authentication and message integrity. A hash function takes a long string (or 'message') of any length as input and produces a fixed length string as output, sometimes termed a message digest or a digital fingerprint.

Examples of synchronization include rsync and Novell's U.S. Pat. No. 6,233,589 named "Method and System for Reflecting Differences Between Two Files". A file sharing service or product, for example, may use an rsync algorithm to share files over a network for different network users or different network computers. Rsync divides files into blocks and addresses the blocks with block numbers. When a block is modified in the file sharing service or product, rsync may detect and send only the modified block. A file sharing service or product may use Electronic Code Book (ECB) mode as an encryption technique. ECB encrypts each block separate. As discussed previously, ECB encrypts identical plaintexts into identical cipher texts, which can reflect data patterns. Another encryption technique is cipher block chaining (CBC), which XORs each block of plaintext with the previous cipher text block before being encrypted, such that each ciphertext block depends on all plaintext blocks processed up to that point. A CBC technique uses an IV for the first block to make each message unique. ECB techniques are vulnerable to watermarking, as is CBC if the IV is known or predictable to an attacker. Watermarking involves an attacker detecting a specially-crafted piece of data without knowing the detection key.

ESSIV (Encrypted Salt-Sector Initialized Vector) is a method for generating initiation vector in CBC. IV=E(SALT, sector_number) where SALT=Hash(KEY). The initiation vector (IV) changes for each block. But when a new block is inserted or deleted then all the other blocks are shifted, providing a problem for decryption since the block number is changed. In a file sharing system or product, the same folder is also subject to change for different clients. Also, a file sharing system or product may work at the file level rather than at a disk block level. The logical block number or sector number cannot be used in the file sharing system or product to implement the ESSIV. This is a problem with using ESSIV in syncing encrypted files.

When encrypted files are to be synchronized, the encryption of one block should not dependent on the data in multiple blocks, either in encrypted or unencrypted form. Else, a relatively small change in the data will require significant processing to update the encrypted, synchronized files. As stated earlier, ECB does not depend on multiple blocks, but is associated with known security concerns. Also, a conventional ESSIV technique to get IV for CBC is not desired for synchronized files since the block number (analogous to sector number) changes whenever file is modified.

The present subject matters modifies ESSIV using a secure hash of unencrypted (or plaintext) data in the logically preceding block of data. Thus, the present subject matter is able to generate an IV using plaintext (encrypted data) of a logically preceding block. The number of blocks upon which the IV is dependent is limited because the generation of the IV is dependent on the plaintext rather than encrypted text.

A random number is generated and is used as an input for an ESSIV function to calculate an IV for the first block of the file. The random number is prepended to the encrypted file or it can be stored in a separate file. The hash of the unencrypted data of the first block is taken and is used as an input for an ESSIV function to calculate an IV for the second block of the file. The hash of the unencrypted data of the second block is taken and is used as an input for an ESSIV function to calculate an IV for the third block of the file. Every block is dependent on it's previous block unencrypted data for the IV calculation except the first block.

The client has or is able to derive the unencrypted data, which is used to encrypt the block in case of insertion or deletion. Various embodiments are used in parallel process of encryption and/or decryption. The file is divided into fixed sized chunks. Each chunk is started with a new IV so that each chunk can be handled with threads in parallel.

According to an embodiment, the techniques presented herein may be implemented within NOVELL® storage products distributed by Novell, Inc. of Provo, Utah and/or LINUX® operating system (OS) environments. Of course it is to be understood that any network architecture, OS, device, proxy, or product may be enhanced to utilize and deploy the techniques presented herein and below.

FIG. 1 illustrates an embodiment of a method for encrypting blocks of a file, according to various embodiments. The figure illustrates the encryption of three blocks of data. Those of ordinary skill in the art will understand, upon reading and comprehending this disclosure, that the illustrated method is not limited to three blocks. The method is implemented in a machine-access and machine-readable medium and is accessible over a network. The network may be wired, wireless, or a combination of wired and wireless.

The illustrated method may be implemented as an enhancement to a service that executes within an operating system or that executes within a standalone storage encryption/decryption replication and synchronization product. For example, a secure synchronization service may be configured to monitor an environment or storage volume (can be sets of volumes) for purposes of replication or synchronization with another volume or a reserved partition of the same volume being monitored. The files of the volume being monitored are synchronized to the other volume or to the reserved partition of the same volume being monitored. The data of the files is encrypted for security purposes and uses an enhanced ESSIV technique achieved by creating unique IVs for each block.

For purposes of illustration and ease of comprehension the processing of the secure synchronization service is discussed with respect to processing a single file on a volume or storage environment. However, the secure synchronization service can monitor all files or configurable subsets of files on the volume or within the storage environment; each file processed in the following manners.

When a first data block (a block without a logically preceding data block) is encrypted, as illustrated in FIG. 1, an ESSIV function 101 for the first data block receives a random number n 102 and an encryption key 103 as inputs. The ESSIV function calculates an IV 104 for the first data block using a secure hash of the random number N and a hash of the encryption key. The IV for the first data block is combined (illustrated as an XOR function) with the plaintext ($P_1$) for the first data block to generate encrypted data ($E_1$) for the first data block. When the next data block (second data block) logically subsequent to the first data block is encrypted, an ESSIV function 105 for the second data block receives a secure hash of the plaintext or unencrypted data ($P_1$) for the first data block, and receives a hash of the encryption key 103 as inputs, and calculates an IV 107 for the second data block. The IV for the second data block is combined (XOR function) with the plaintext ($P_2$) for the second data block to generate encrypted data ($E_2$) for the second data block. When the next data block (third data block) logically subsequent to the second data block is encrypted, an ESSIV function 108 for the third data block receives a secure hash of the plaintext or unencrypted data ($P_2$) 109 for the second data block, and receives a hash of the encryption key 103 as inputs, and calculates an IV 110 for the third data block. The IV for the third data block is combined (XOR function) with the plaintext ($P_3$) for the third data block to generate encrypted data ($E_3$) for the third data block. The illustrated encryption process continues for subsequent blocks.

Figure 2A:
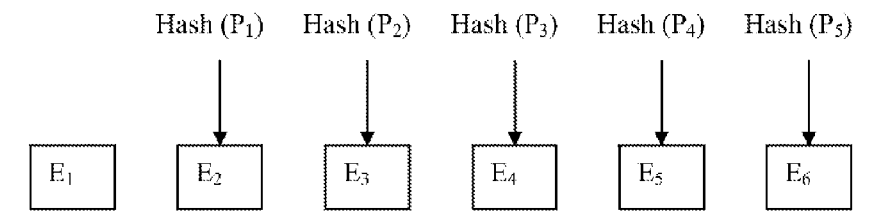
FIGS. 2A-2C illustrate logically contiguous blocks of encrypted data, the deletion of a block of data, and the insertion of the block of data, according to various embodiments.
Figure 2B:
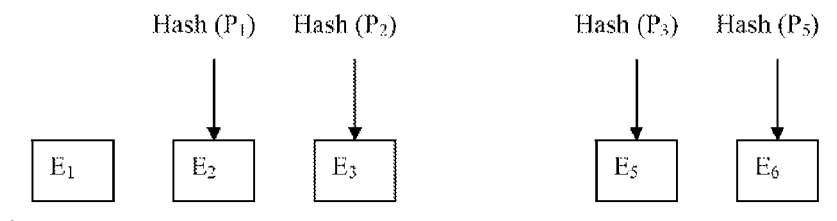
Figure 2C:
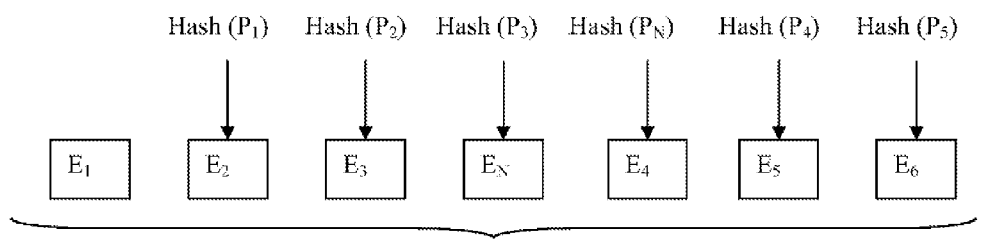

While encrypting, when few bytes are added in plaintext, the bytes form a new block and the extra space in the block is filled with zeros. This data is stored as part of the file. Deletions are a similar case. FIGS. 2A-2C illustrate logically contiguous blocks of encrypted data (FIG. 2A), the deletion of a block of data (FIG. 2B), and the insertion of the block of data (FIG. 2C), according to various embodiments. FIG. 2A illustrates the relationship between logically contiguous, encrypted data blocks $E_1$-$E_6$ and the plain text blocks ($P_1$-$P_5$). The encrypted block depends on the plaintext of the previous block. In FIG. 2B, encrypted data block $E_4$ is deleted. Only $E_5$ is encrypted to accommodate the deletion of $E_4$, where $E_5$ now depends on the plaintext of $E_3$. In FIG. 2C, a new data block (N) is inserted between data blocks 3 and 4. The encryption of data block N ($E_N$) depends on the plaintext of the logically preceding data block ($P_3$). The fourth data block is re-encrypted, such that the encrypted block ($E_4$) depends on the plain text of data block N ($P_N$). No other re-encryption is required. Thus, the present subject matter accounts for added or deleted blocks using a process that reduces the size of the difference, which is useful for the synchronization of encrypted files or finding the difference between encrypted files.

Figure 3A:
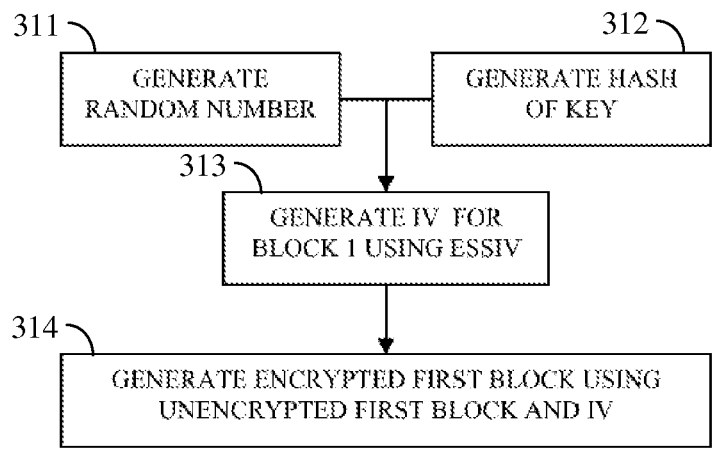
FIGS. 3A-3B illustrate a process performed in the illustration of FIG. 1, according to various embodiments.
Figure 3B:
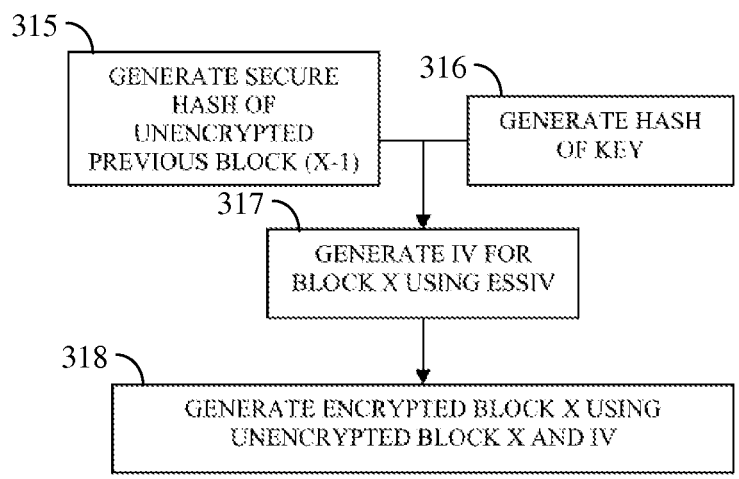

FIGS. 3A-3B illustrate a process performed in the illustration of FIG. 1, according to various embodiments. FIG. 3A illustrates a process for encrypting the first logical data block, and FIG. 3B illustrates a process for encrypting subsequent data blocks to the first data block. The first logical data block is encoded by generating a random number 311, generating a hash of an encryption key 312, generating an IV for the first data block 313 using ESSIV, the random number and the hash of the encryption key, and generating the encrypted first data block 314 using the unencrypted first data block and the IV for the first data block. Subsequent logical data blocks are encoded by generating a secure hash of the unencrypted previous block (X−1) 315, generating a hash of an encryption key 316, generating an IV for the Xth data block 317 using ESSIV and the secure hash and the hash of the encryption key, and generating an encrypted block X 318 using the unencrypted block X and the IV for the Xth data block.

Figure 4A:
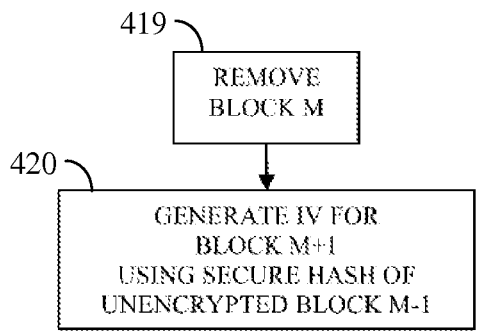
FIGS. 4A-B illustrate an embodiment of a process for deleting and inserting encrypted blocks, such as illustrated in FIGS. 2A-2B.
Figure 4B:
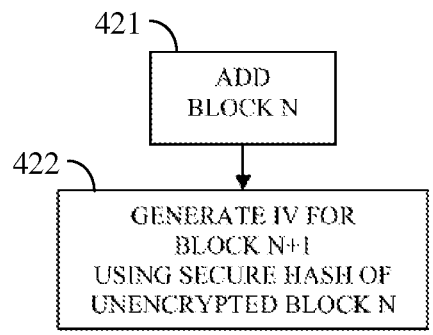

FIGS. 4A-B illustrate an embodiment of a process for deleting and inserting encrypted blocks, such as illustrated in FIGS. 2A-2B. After block M is removed 419, an IV is generated for block M+1 using a secure hash of unencrypted or plain text block M−1 420, and block M+1 is encoded using the IV for block M+1. After block N is inserted 421, a revised IV for block N+1 is generated using a secure hash of unencrypted block N 422, and block N+1 is encoded using the revised IV. Block N is encoded using an IV for block N generated using a secure hash of the plaintext for block N−1.

The present subject limits the dependency of each encoded block on other blocks. Thus, limited data needs to be synchronized when data is changed. This allows systems to be created that limits the processing (e.g. synching) based on a detected difference between encrypted files or a difference between decrypted files.

FIG. 5A illustrates the relationship between a successive series of changed encrypted blocks and their corresponding plaintext blocks. The non-changed encrypted blocks $E_Y$ and $E_Z$ bound the series of changed encrypted blocks ($E_{Y+1}$-$E_{Z-1}$). A sync service using the encryption technique of the present subject matter will only transfer $E_{Y+1}$-$E_{Z-1}$ as changed, as it is known that the plaintext blocks $P_Y$, $P_{Z-1}$ and $P_Z$ are not changed.

FIG. 5B illustrates the relationship between a successive series of changed plaintext blocks and their corresponding encrypted blocks. The non-changed plaintext blocks $P_{Y-1}$, $P_Y$ and $P_Z$ and $P_{Z+1}$ bound the series of changed plaintext blocks ($P_{Y+1}$-$P_{Z-1}$). A sync service will only transfer $E_{Y+1}$-$E_Z$, as it is known that the encrypted blocks $E_Y$ and $E_{Z+1}$ are not changed.

Thus, for example, a differential algorithm can be performed to identify different encrypted data blocks for two encrypted files, including to identify logically successive encrypted data blocks that are different bounded by a logically precedent encrypted data block ($E_Y$) and a logically subsequent encrypted data block ($E_Z$) which are not different for the two encrypted files. The encrypted block $E_{Y+1}$ through encrypted block $E_{Z-2}$ are processed as corresponding to potentially different plaintext blocks. A differential algorithm can be performed to identify different unencrypted data blocks for two unencrypted files that have a previously encrypted version, including to identify logically successive, different unencrypted data blocks bounded by at least two logically preceding and adjacent unencrypted blocks ($P_{Y+1}$ and $P_Y$) that are not different, and a logically subsequent unencrypted block ($P_Z$) that is not different. The encrypted version is updated. Plaintext block $P_{Y+1}$ through plaintext block $P_Z$ are encrypted without encrypting plaintext block $P_Y$ and plaintext block $P_{Z-1}$.

Those of ordinary skill in the art will understand, upon reading and comprehending this disclosure, how to use the IV for a block and the encrypted block to decipher or generate the plaintext for the block, and how to derive the IV using the encryption key, the hash function for the encryption key, and the plaintext for the previous block and cryptographic hash function (or random number for a first block).

FIG. 6 illustrates an embodiment of a file synchronization system. The system is implemented in a machine-accessible and readable medium and is accessible over a network. The network may be wired, wireless, or a combination of wired and wireless. In an embodiment, the system implements, among other things, various aspects of the methods discussed herein.

The system includes a data sharing client 623 with a synchronization service 624, an initialization vector (IV) service 625, and a cipher service 626. The synchronization service is implemented in a machine-accessible and readable medium and is to process on a machine. The synchronization service is to compare the shared data between clients to identify a delta for the data, and use the delta to update the shared data. The cipher service is implemented in a machine-accessible and readable medium and is to process on a machine. The cipher service is to encrypt/decrypt data blocks. This is done via encrypted blocks that when assembled in the proper order represented the decrypted version for the file. The IV service is implemented in a machine-accessible and readable medium and is to process on the same machine or a different machine of the network. The IV service is to produce an IV for each block of the file. Each IV permits a particular block of data associated with the file to be encrypted or decrypted when supplied to a cipher service. In operation, the synchronization service invokes the IV service and cipher service to produce encrypted versions of the file or to produce decrypted versions of the file. This is done by passing the data blocks along to the IV service which produces the IVs, and passing the IVs along with their data blocks to a cipher service. The cipher service provides the encrypted or decrypted versions of the data blocks. The synchronization service synchronizes the files.

FIG. 7 illustrates an embodiment of a file differential system. The system is implemented in a machine-accessible and readable medium and is accessible over a network. The network may be wired, wireless, or a combination of wired and wireless. In an embodiment, the system implements, among other things, various aspects of the methods discussed herein.

The system 727 includes a differential service 728, an initialization vector (IV) service 729, and a cipher service 730. The differential service is implemented in a machine-accessible and readable medium and is to process on a machine. The differential service is to compare the data between two files (e.g. File Y and File Z) to identify a delta that identifies the differences between the files. The cipher service is implemented in a machine-accessible and readable medium and is to process on a machine. The cipher service is to encrypt/decrypt data blocks. This is done via encrypted blocks that when assembled in the proper order represented the decrypted version for the file. The IV service is implemented in a machine-accessible and readable medium and is to process on the same machine or a different machine of the network. The IV service is to produce an IV for each block of the file. Each IV permits a particular block of data associated with the file to be encrypted or decrypted when supplied to a cipher service. In operation, the differential service invokes the IV service and cipher service to produce encrypted versions of the file or to produce decrypted versions of the file. This is done by passing the data blocks along to the IV service which produces the IVs, and passing the IVs along with their data blocks to a cipher service. The cipher service provides the encrypted or decrypted versions of the data blocks. The differential service identifies the changes between the files.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   encrypting a data block within logically contiguous data blocks using processing circuitry, wherein encrypting the data block includes:
   generating a hash of an encryption key;
   generating an initialization vector (IV);
   generating encryption data for the data block from plaintext data for the data block using the IV, wherein the IV is generated using the hash of the encryption key and the hash of plaintext data for a logically preceding data block.

2. The method of claim 1, wherein generating the initialization vector includes generating a cryptographic hash of the plaintext for the logically preceding data block, and applying an encryption salt-sector initialization vector technique using the hash of the encryption key and the cryptographic hash of the plaintext for the logically preceding data block.

3. The method of claim 1, wherein for a first data block within the logically continuous data blocks, the IV is generated using the hash of the encryption key and a random number.

4. The method of claim 1, wherein generating encryption data for the data block includes performing an XOR function on the initialization vector and the plaintext for the data block.

5. The method of claim 1, wherein each of the logically contiguous data blocks include encrypted data, the method further comprising:
   deleting one of the logically contiguous data blocks using the processing circuitry; and
   re-encrypting data to account for the deleted data block using the processing circuitry, wherein re-encrypting data includes only re-encrypting a data block logically subsequent to the deleted data block to account for the deleted data block.

6. The method of claim 5, wherein only re-encrypting the logically subsequent data block to the deleted data block includes generating an initialization vector using a cryptographic hash of plaintext for a data block logically preceding the deleted data block and the hash of the encryption key, and generating encrypted data for the logically subsequent data block to the deleted data block using the initialization vector and plaintext for the logically subsequent data block to the deleted data block.

7. The method of claim 1, wherein each of the logically contiguous data blocks include encrypted data, the method further comprising:
   inserting a data block into the logically contiguous data blocks using the processing circuitry;
   encrypting the inserted data block using the processing circuitry; and
   re-encrypting data to account for the inserted data block using the processing circuitry, wherein re-encrypting data includes only re-encrypting a data block logically subsequent to the inserted data block to account for the inserted data block.

8. The method of claim 7, wherein encrypting the inserted data block includes generating an initialization vector (IV), and generating encryption data for the inserted data block from plaintext data for the inserted data block using the initialization vector, wherein the IV is generated using the hash of the encryption key and plaintext for a data block logically preceding the inserted data block.

9. The method of claim 7, wherein only re-encrypting a data block logically subsequent to the inserted data block to account for the inserted data block includes generating an initialization vector using a cryptographic hash of plaintext for the inserted data block and the hash of the encryption key, and generating encrypted data for the data block logically subsequent to the inserted data block using the initialization vector and plaintext for the logically subsequent data block to the inserted data block.

10. The method of claim 1, further comprising:
    performing a differential algorithm, using the processing circuitry, to identify different encrypted data blocks for two encrypted files, including identifying logically successive encrypted data blocks that are different encrypted data blocks which are not different for the two encrypted files.

11. The method of claim 10, further comprising transferring only the identified, different encrypted data blocks to synchronization service to synchronize the two encrypted files.

12. The method of claim 1, further comprising decrypting the data block, wherein decrypting the data block includes generating the initialization vector for the data block using the hash of the encryption key and the cryptographic hash of the plaintext for a logically preceding data block.

13. A method, comprising:
    encrypting data blocks within logically contiguous data blocks using processing circuitry, wherein encrypting data blocks includes:
      generating a hash of an encryption key;
      generating an initialization vector (IV);
      generating encryption data for the data block, including performing an XOR function on the IV and plaintext data for the data block,
      wherein for a first data block within the logically continuous data blocks, the IV is generated using the hash of the encryption key and a random number,
      wherein for data blocks other than the first data block within the logically continuous data blocks, the IV is generated using the hash of the encryption key and the hash of plaintext data for a logically preceding data block.

14. The method of claim 13, wherein each of the logically contiguous data blocks include encrypted data, the method further comprising:
    deleting one of the logically contiguous data blocks using the processing circuitry; and
    re-encrypting data to account for the deleted data block using the processing circuitry, wherein re-encrypting data includes only re-encrypting a data block logically subsequent to the deleted data block to account for the deleted data block.

15. The method of claim 14, wherein only re-encrypting the logically subsequent data block to the deleted data block includes generating an initialization vector using a cryptographic hash of plaintext for a data block logically preceding the deleted data block and the hash of the encryption key, and generating encrypted data for the logically subsequent data block to the deleted data block using the initialization vector and plaintext for the logically subsequent data block to the deleted data block.

16. The method of claim 13, wherein each of the logically contiguous data blocks include encrypted data, the method further comprising:
    inserting a data block into the logically contiguous data blocks using the processing circuitry;
    encrypting the inserted data block using the processing circuitry; and
    re-encrypting data to account for the inserted data block using the processing circuitry, wherein re-encrypting data includes only re-encrypting a data block logically subsequent to the inserted data block to account for the inserted data block.

17. The method of claim 16, wherein encrypting the inserted data block includes generating an initialization vector (IV), and generating encryption data for the inserted data block from plaintext data for the inserted data block using the initialization vector, wherein the IV is generated using the hash of the encryption key and plaintext for a data block logically preceding the inserted data block.

18. The method of claim 16, wherein only re-encrypting a data block logically subsequent to the inserted data block to account for the inserted data block includes generating an initialization vector using a cryptographic hash of plaintext for the inserted data block and the hash of the encryption key, and generating encrypted data for the data block logically subsequent to the inserted data block using the initialization vector and plaintext for the logically subsequent data block to the inserted data block.

19. The method of claim 13, further comprising decrypting the data block using the processing circuitry, wherein decrypting the data block includes generating the initialization vector for the data block using the hash of the encryption key and the cryptographic hash of the plaintext for a logically preceding data block.

20. A system, comprising:
    at least one machine and at least one machine-accessible and readable medium; and
    a cipher service and an initialization vector service implemented in the at least one machine-accessible and readable medium and to process on the at least one machine, wherein the initialization service is to generate initialization vectors and the cipher service is to transform plaintext data into encrypted data using the initialization vectors, wherein the system is configured to use the cipher service and the initialization vector service to encrypt a data block within logically contiguous data blocks, wherein in encrypting the data block the system is configured to:

generate a hash of an encryption key;
generate an initialization vector (IV); and
generate encryption data for the data block from plaintext data for the data block using the IV, wherein the IV is generated using the hash of the encryption key and the hash of plaintext data for a logically preceding data block.

* * * * *